(12) United States Patent
Wünning

(10) Patent No.: US 6,293,275 B1
(45) Date of Patent: Sep. 25, 2001

(54) HIGH-TEMPERATURE GAS HEATER

(76) Inventor: Joachim Wünning, Berghalde 20, 71229 Leonberg (DE)

( * ) Notice: Subject to any disclaimer, the term of this patent is extended or adjusted under 35 U.S.C. 154(b) by 0 days.

(21) Appl. No.: 09/560,104

(22) Filed: Apr. 28, 2000

(30) Foreign Application Priority Data

Apr. 28, 1999 (DE) ............................................. 199 19 293

(51) Int. Cl.⁷ .................................................. F24C 3/00
(52) U.S. Cl. .................................. 126/91 A; 126/92 AC; 126/101; 431/116; 431/215
(58) Field of Search ................. 126/91 R, 91 A, 126/92 AC, 85 R, 92 C, 92 R, 101; 431/1, 158, 347, 115, 326, 116, 215

(56) References Cited

U.S. PATENT DOCUMENTS

| 4,255,122 | 3/1981 | Akpkvist et al. . |
|---|---|---|
| 5,003,349 | 3/1991 | Welp et al. . |
| 5,154,599 | 10/1992 | Wunning . |
| 5,261,812 | * 11/1993 | Javet et al. .......................... 126/92 R |
| 5,464,006 | 11/1995 | Kedjeff et al. . |
| 5,483,948 | * 1/1996 | Van Der Veen ................... 126/92 C |
| 5,570,679 | 11/1996 | Wunning . |

FOREIGN PATENT DOCUMENTS

| 2310367 | * 9/1973 | (DE) ............................... 126/92 AC |
|---|---|---|
| 4419332 | 6/1994 | (DE) . |

* cited by examiner

Primary Examiner—James C. Yeung
(74) Attorney, Agent, or Firm—Leydig, Voit & Mayer, Ltd.

(57) ABSTRACT

A compact heat source is provided which includes a bell-shaped or conical recuperator that surrounds a combustion chamber. The recuperator consists of parts that are axially tensioned against one another, so that a stable positioning of a partition wall provided with projections both on a bell-shaped outer wall and also on a bell-shaped inner wall is ensured.

12 Claims, 2 Drawing Sheets

HIGH-TEMPERATURE GAS HEATER

FIELD OF THE INVENTION

The invention relates to a heat source and, more particularly to a heat source for generating of high-temperature heat.

BACKGROUND OF THE INVENTION

Heat sources for temperatures up to approximately 1000° C. are needed particularly in the technology of block-type thermal power stations for transforming fuel energy into current and heating warmth in small decentralized units. In such cases, the object is high efficiency with small units. Furthermore, low emissions ($NO_x$ and CO) are desirable. Specifically, a heat source with high dependability and a useful life with simple installation and little maintenance are desirable for use in building heating systems. Furthermore, it must be possible to economically manufacture the heat sources in large runs.

U.S. Pat. No. 5,003,349 discloses a Stirling motor with a combustion chamber surrounded by an annular waste gas/air heat exchanger, which is also designated as a recuperator and serves the purpose of transferring exhaust gas heat to fresh air in counterflow. The recuperator is surrounded with a pot-type thermal insulation.

For a high total efficiency, recuperators should be as efficient as possible. If the gas heater is to be used in small block-type thermal power stations, a compact, simple and sturdy construction is required.

OBJECTS AND SUMMARY OF THE INVENTION

Accordingly, in view of the foregoing, a general object of the present invention is to provide a compact heat source with good efficiency.

The present invention provides these and other advantages and overcomes the drawbacks of the prior art by providing a heat source which includes a combustion chamber and an exhaust gas/air heat exchanger (recuperator), the diameter of which increases in axial direction. The recuperator can be, for example, conical, truncated conical, bell-shaped or cone-shaped. The bell form provides the advantage that, in the conical portion, gap widths in the millimeter range (less than 5 mm, below 2% of the mean recuperator diameter) can be achieved with tolerances of 10% of the gap width, which permits a uniform flow at the circumference of the recuperator. The partition wall of the recuperator is suitably to be provided on its inside and/or outside with knobs or burls, which establish the gap width. Despite this fitting accuracy, which is important for the convective heat transition, because of the conical portion of the bell form, the individual parts of the recuperator can be inserted into one another simply and also disassembled. Alpha-values are possible of up to 150–250 W/k.m². The recuperator can be implemented in a compact form and with low weight; it consists only of a few simple parts (e.g., merely three substantially conical parts), and it is self-adjusting.

In the domed portion of the bell, the heat transition takes place at high temperatures, predominantly by radiation; as the gap width plays a subordinate role. In contrast, the considerable amount of the recuperator parts that are disposed in this area an be contained best by the domed construction form.

The small size and precise maintenance of the gap geometry permits low pressure losses on the exhaust-gas and the air-side as well as intensive heat exchange with a small heat-exchanger surface and thus a small volume. Moreover, arranging the combustion chamber at least partly in the interior space enclosed by the recuperator produces a compact construction. The combustion chamber can be designed to accommodate both combustion with flames, and also with flameless combustion, which allows particularly low $NO_x$ and CO values. An adjustable jet nozzle permits the flameless operation even with a partial load. With regard to the flameless combustion, reference is made to DE 44 19 332 Al and to patent application P 198 56 933.

Insulating the combustion chamber against the recuperator and insulating the recuperator to the outside provides thermal advantages. Insulating material can be provided in, for example, an evacuated space which is built in the outer wall of the recuperator. A domed outer form protects against deformation by air pressure. While the thickness of the outer insulation decreases toward the cold end of the recuperator, in an advantageous embodiment, the thickness of the inner insulation, as measured in radial direction, increases in the same direction. Thus, the heat losses of the combustion chamber and the heat losses of the recuperator can be minimized with a small structural volume.

The combustion chamber functions so as to generate a high temperature level, for example, to execute chemical reactions, as a gas mixture induced through the combustion chamber is heated therein. The reaction is set weakly exothermally (partial oxidation) in order to make up for wall losses. In this manner, the gas heater can serve without a separate high temperature heat exchanger, for example as a gas generator for a fuel cell.

A high temperature heat transfer device can also be connected to the combustion chamber. This can be in the form of one or more channels, for example tubes, which extend through the combustion chamber or through a space traversed by exhaust gas. In the combustion chamber high-temperature heat can be drawn off, for example for a thermal power apparatus (block-type thermal power technology). Furthermore, the gas can comprise a gas which is to be altered chemically. The gas heater, therefore, can serve also as a hydrogen generator in the vapor reforming process of fossil fuels or methanol.

Hot exhaust gas drawn off from the combustion chamber can be used to heat a steam generator in order, for example, to recover vapor needed for a vapor-reforming process. By controlling or regulating the exhaust gas streams between the recuperator and the steam generator, the distribution of the energy flows of the steam from the steam generation and from the vapor-reforming process can be adjusted very rapidly to changing loads. This enables their use in hydrogen generation for the operation of fuel cells in motor vehicles. Likewise, for use in power-heat coupling, a variable distribution of heat generation and mechanical energy generation is possible. Thus, in addition to the warmth given off by a Stirling motor, heating warmth can be derived.

For removing low-temperature warmth a coil-type condenser can be provided at the cold end of the recuperator in or on the exhaust gas channel. Because of the large diameter of the recuperator, the flaw speed is not too large in this location, so a few tube turns suffice for a good heat transfer. The pressure loss is also low.

In close proximity, an air filter can be provided in front of the entrance to the air channel. The result is a compact component that contains all of elements essential for the gas heater. Flow speed and pressure loss are low.

In the combustion chamber, catalysts can be arranged, for example, on the heat consuming elements (fluid-conducting tubes). As a result, the oxidation of the fuel takes place at lower temperatures directly on the heat sinks (tubular heaters). Improved heat transition can result and overheating of the catalysts can be prevented. Further, catalysts can be arranged in the exhaust gas channel of the recuperator, for example, on the inner wall of the recuperator, in order to reduce emissions.

In the combustion chamber, an electrically driven heat source can be provided, such as, for example, an incandescent heater. This allows a simple starting operation and a large regulating range. Moreover, the combustion chamber can be particularly laid out in combination with a catalyst and an adjustable jet nozzle so as to allow for different temperatures and loads, which can likewise facilitate the starting, and produces a good regulating range. The jet nozzle permits an internal recirculation in the combustion chamber to be maintained, even with a small load. The recuperator is well suited to be constructed of a ceramic material.

The present invention can provide the following advantages:

high efficiency, i.e. low exhaust gas and wall losses;

low combustion-caused emissions ($NO^x$ and $CO$);

favorable regulating behavior;

low pressure loss for gas and combustion air;

high dependability and long useful life;

simple mounting, minimal maintenance;

a lightweight, compact construction;

capable of being manufactured relatively economically in large runs.

These and other features and advantages of the invention will be more readily apparent upon reading the following description of a preferred exemplary embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
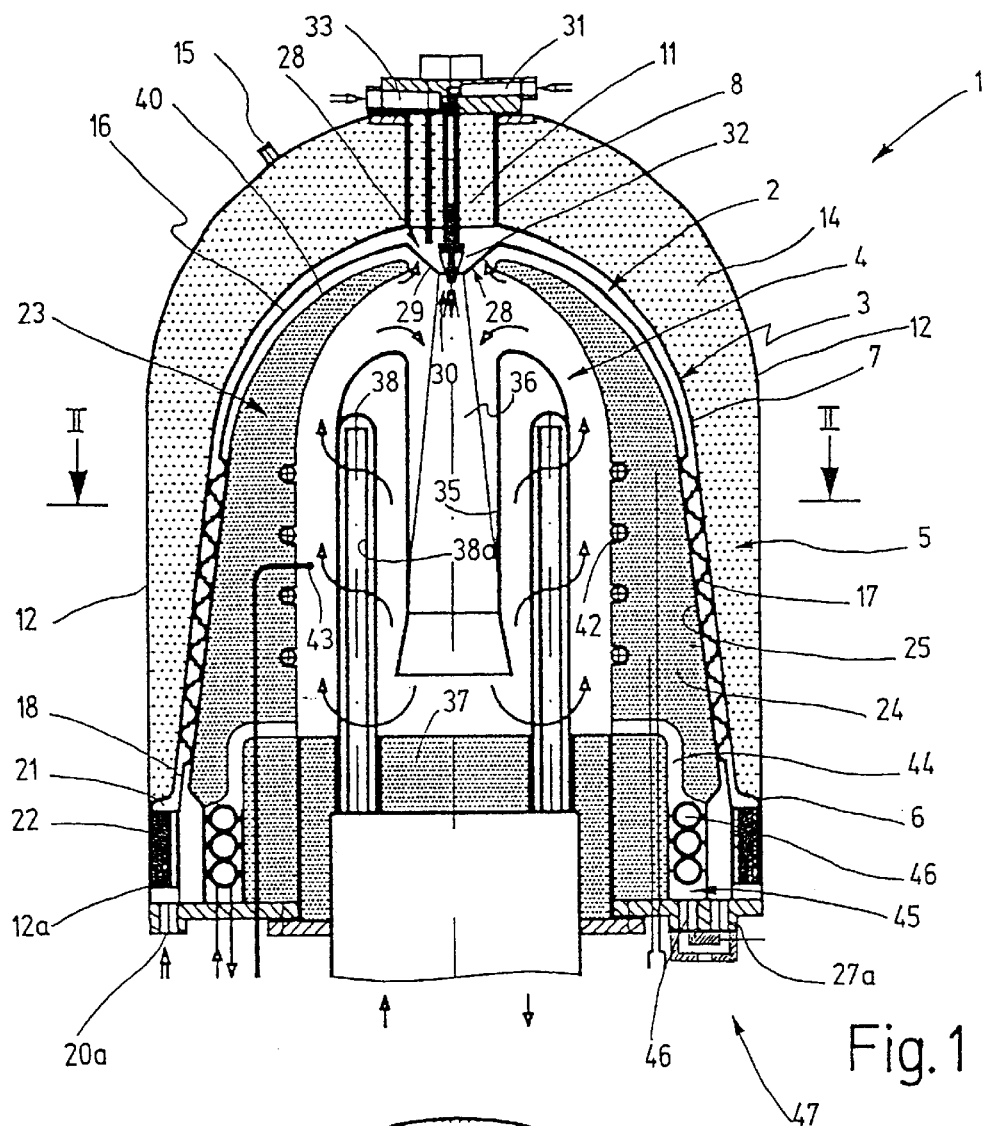
FIG. 1 is a schematic, longitudinal section view of an illustrative gas heater constructed in accordance with the present invention.

Referring now to FIG. 1 of the drawings, there is illustrated a gas heater 1 serving as heat source, which contains a substantially bell-shaped recuperator 3 with gap-formed gas channels and a combustion chamber 4, which is arranged in an interior space enclosed by the recuperator 3.

The recuperator 3 has a bell-shaped outer portion 5 made of sheet metal, which extends, starting from a lower edge 6 somewhat conically to a transition point 7, from which it extends in a cupola-shaped dome to a face opening 8. A burner 11 having a jet nozzle is arranged in the face opening.

An outer hood 12 extends from the outer end of the face opening back to the lower edge 6 of the outer portion 5. A closed hollow space 14 is formed in the outer portion 5, which is filled with a thermal insulating material. The interior space 14, furthermore, can be evacuated in order to improve the thermal insulation via a pump attachment 15.

Furthermore, the recuperator 3 includes a partition wall 16, which is shaped to follow with somewhat reduced diameter the interior form of the outer portion 5. In the conically constructed area of the partition wall 16, inwardly and outwardly projecting knobs or otherwise closed projections 17 are provided, with the outer projections 17 lying on the outer portion 5. The partition wall 16 is supported with its lower edge 18 on a base 20, for example of die cast aluminum. The partition wall 16 can consist of metal or entirely or partially of a ceramic material. For example, the partition wall 16, including the projections 17, can be produced by the slip casting process. Additionally, the partition wall can be composed of a conical low-temperature section made of metal and a cupola-shaped ceramic part.

An annular inlet space 21, in which an air filter 22 is arranged, is provided between the last part of the partition wall 16, or a tubular continuation 19 (FIG. 3) of the base 20. The relatively large flow cross-section enables low pressure losses. At least one inlet opening 20a, to which, for example, a blower is connected, extends into the inlet space 21.

The recuperator 3 also includes an inner portion 23. The inner portion 23 has, at least in the conical portion of the recuperator, a truncated conical or conical contour. It further fits against the cupola-form vaulting of the partition wall 16, which is preferably constructed without projections in this area. The inner portion 23 can be in the form of an insulating body 24 with a sheet metal mantle 25.

While the thickness of the outer insulator (interior space 14) decreases from the warm end of the recuperator 3 toward its cold end, the thickness of the insulating body 24 increases in the same direction. The total thickness of the inner and of the outer insulation, i.e. the sum of the thickness measured at a right angle to the wall of the insulating body 24 and the outer portion 5, however, is preferably substantially constant.

The projections 17 to the outside of the partition wall 16 support the outer portion 5 and establish a gap-form air channel 26 extending away from the inlet space 21. The inner projections 17 are supported on the inner portion 23 and establish a gap-form exhaust gas channel 27. The total thickness of the recuperator 3 is determined by the height of the projections 17. The exhaust gas channel 27 leads to an exhaust gas connection 27a provided on the base 20.

The insulating body 24 encloses the combustion chamber 4 and has on its upper end a passage opening 28. A conical projection 29 on the partition wall 16 extends into the passage opening 28. The projection 29 has an opening 30, through which air and fuel can pass into the combustion chamber 4. To allow the passage of air and fuel, the burner 11 is provided with a fuel channel 31 and with an air channel 33, which lead to a conical nozzle 32.

A guide tube 35 is arranged opposite the nozzle 32 in the combustion chamber 4 in order to produce a large-space circulation flow in the combustion chamber 4. In FIG. 1, the flow is indicated by arrows. The guide tube 35 acts as diffusor and the end of the guide tube arranged away from the nozzle 32 is enlarged in funnel form. The conical fuel jet 36 extending from the nozzle 32 breaks up and mixes gases present in the combustion chamber 4. The large-volume circulation in the combustion chamber 4 permits flameless oxidation with a corresponding layout of the nozzle 32 also with a partial load.

On the base side, the combustion chamber is closed off by a cylindrical insulating centering base 37, which is engaged by the inner portion 23. Both this and the centering base are supported on the base 20. The combustion chamber 4, therefore, is insulated on all sides.

For heat removal, end-side closed tubes 38 extend into the combustion chamber 4. End-side open tubes 38a, which serve to supply medium to be warmed, are arranged in the closed tubes. The tubes 38, 38a form channels for removing high-temperature heat and are traversed, for example, by the working medium of a power machine or by another gas to be heated to high temperatures.

If necessary, other tube configurations can also be used. A catalyst can be arranged on the surface of the tubes 38 in order to promote oxidation in the combustion chamber 4, particularly at the start of operation. Furthermore, a catalyst 40 can be arranged on the area of insulating body 24 domed in cupola form, on its side facing the partition wall 16, in order to post-process the exhaust gas.

In the illustrated embodiment, the combustion chamber 4 includes an electric heater 42, which is formed by heating coils provided in the chamber wall. These heating coils serve especially for warming of the combustion chamber 4 before ignition. Furthermore, a thermal element 43 can be provided for monitoring the operation of the combustion chamber 4.

Optionally, an exhaust gas channel 44 can lead out of the combustion chamber 4, bypassing the recuperator 3. The exhaust gas channel 44 leads to a heat exchanger chamber 45, in which there is arranged a (low temperature-) heat transfer device 46 (pipe coil). This can serve, for example, for vapor (or steam) generation. An exhaust gas connection 46 extends from the heat exchanger chamber 45. The exhaust gas connections 27a, 46 are connected to a two-way regulating valve 47 (or a corresponding slide valve) which regulates the amount of the exhaust gas flows passing through the exhaust gas channels 27, 44, and thereby the distribution of the energy flows.

Figure 2:
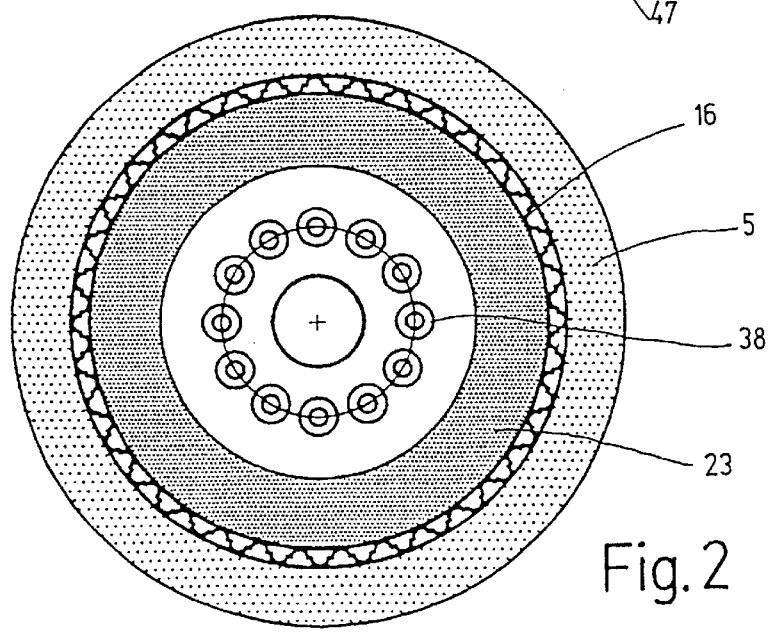
FIG. 2 is a cross-sectional view of the gas heater of FIG. 1 taken in the plane of line II—II in FIG. 1.

FIG. 2 illustrates the gas heater 1 of FIG. 1 in cross-section. From FIG. 2, it is especially evident how the outer portion 5 is supported over the partition wall 16 on the inner portion 23.

The operation of the gas heater 1 is, with reference to FIG. 1, as follows. To start the gas heater 1, the combustion chamber 4 is first warmed with the electric heater 42. When a minimum temperature is reached, gas or a gas-and-air mixture is blown over the burner 11 into the combustion chamber 4. If necessary, the gas heater 1 can also be started with an ignited flame and driven up. If catalysts are present on the tubes 38, these support the reaction now setting in. With the rising temperature, also more gas can now be fed in until the combustion chamber 4 has reached its desired temperature.

Figure 3:
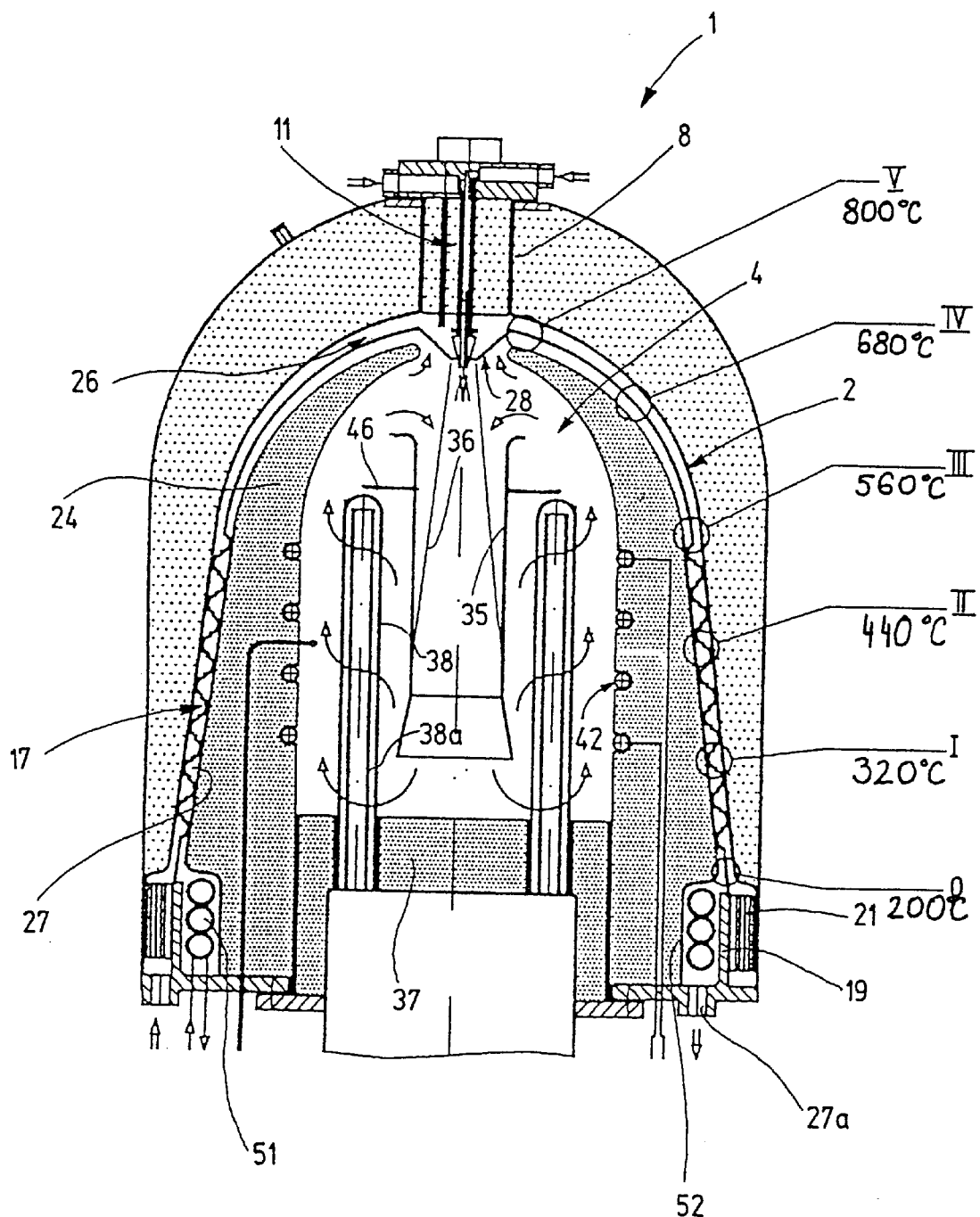
FIG. 3 is a schematic, longitudinal section view of an alternative embodiment of a gas heater of the present invention.

A fuel-and-air mixture jet issues from the burner 11 and enters into the tube 35. The jet drives an annular flow in the combustion chamber 4 and mixes with this in the tube 35. The preferably flameless oxidation of the gas-and-air mixture occurs here. The combustion products leave the combustion chamber 4 through the opening 28 at, for example, 900° C. to 1000° C. The recuperator warms the inflowing air in the air channel 28 to about 900° C. The further temperature course is illustrated in FIG. 3. The exhaust gases undergo a cooling to less than 200° C. in the recuperator 3.

The gas heater 1 is controlled or regulated with the aid of the temperatures of the combustion chamber 4 and of the heat transfer device 46. By influencing the feed of fuel and air, a first regulating loop holds the temperature of the combustion chamber 4 at the desired value, regardless of whether the exhaust gases are led entirely, partly, or not at all through the recuperator 3. A second regulating loop regulates the temperature of the heat transfer device 46 by adjusting the valve 47. If all the heat generated is to be removed as high-temperature heat, the regulating arrangement with the valve 47 closes the path leading over the exchanger 46. If, however, some heat is to be removed to the heat exchanger, the regulating arrangement opens this path according as necessary. The resulting decrease in preheating for the combustion chamber 4 is balanced by increasing the supply of fuel. The control or regulation is therefore very simple and rapidly adjustable with rapid reaction to changing loads. The exhaust gases leave the recuperator 3 with a residual heat of less than 200° C. For utilizing the exhaust gases, a further heat transfer device 51 can be provided on the cold end of the exhaust gas channel 27 (FIG. 3). To this end, the insulating body 24 can be provided with an annular recess 52 having about the same height as the annular projection 19. The annular chamber thus formed can receive the heat transfer device 51 to which there is connected, for example, a building heating system or another type of heat consumer for low-temperature warmth.

If a heat sink of another type exists, the high-temperature heat transfer device that is formed by the tubes 38, 38a, can be omitted. The heat emission can take place in any other way. With a compact heat source 1, a bell-shaped or conical recuperator 3 surrounds the combustion chamber 4. The recuperator 3 consists of parts 13, 16, 24, axially tensioned against one another, so as to ensure the permanent positioning of a partition wall 16 provided with projections 17 both on a bell-shaped outer wall 5 and also on a bell-shaped inner wall 23.

EXAMPLE OF APPLICATION

Heat Source for a Stirling Motor

| | |
|---|---|
| Heat requirement of the tube heater: | 12 kW |
| Temperature of the heated gas: | 700° C. |
| Temperature in the combustion chamber: | approx. 1000° C. |
| Fed-in fuel energy: | approx. 14 kW |
| Efficiency of the heating: | approx. 86% |
| Preheating of air: | approx. 900° C. |
| Exhaust gas temperature: | approx. 150° C. |
| $NO_x$ in exhaust gas (flameless operation): | <20 ppm |
| Dimensions | |
| Combustion chamber | |
| External diameter | 400 mm |
| External length: | 400 mm |
| Internal diameter: | 200 mm |
| Internal length: | 200 mm |
| Internal volume: | 6.3 dm$^3$ |
| Recuperator | |
| Mean diameter | 300 cm |
| Conicity: | 5° |
| Gap width: | 2 mm |

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A heater for generating high temperature heat, comprising:

an exhaust gas/air heat transfer device having a symmetrical configuration in an axial direction with a circular cross section, a combustion chamber disposed at least partially in an interior space enclosed by the exhaust gas/air heat transfer device, said exhaust gas/air heat transfer device including an outer wall and an inner wall with sides of the outer and inner walls being in spaced apart relation to each other, a partition between said outer and inner walls, said partition having projections engageable with said inner and outer walls, and said inner wall and outer wall being separated by a distance of less than about 2% of the diameter of the exhaust gas/air heat transfer device.

2. The heater according to claim 1 wherein the exhaust-gas/air heat transfer device has a conical shaped inner insulation portion.

3. The heater according to claim 1 further including a burner for directing a fluid into said combustion chamber for flameless oxidation.

4. The heater according to claim 1 including a high-temperature heat transfer device connected to said combustion chamber.

5. The heater according to claim 4 wherein the high-temperature heat transfer device includes a channel for directing fluid through the combustion chamber.

6. The heater according to claim 1 wherein a catalyst is provided in the combustion chamber.

7. The heater according to claim 1 wherein a heat source is connected to a Stirling motor of a gas turbine.

8. The heater according to claim 1 including a first exhaust-gas channel connected to the combustion chamber and extending through the exhaust-gas/air heat transfer device and a further exhaust-gas channel connects to a second heat transfer device.

9. The heater according to claim 1 wherein the exhaust gas/air heat transfer device is constructed at least partially of a ceramic material.

10. The heater according to claim 1 wherein the exhaust-gas/air heat transfer device has a bell-shape.

11. A heater for generating high temperature heat, comprising:

an exhaust gas/air heat transfer device having a symmetrical configuration in an axial direction with a circular cross section, a combustion chamber enclosed by the exhaust gas/air heat transfer device, said exhaust gas/air heat transfer device including an outer thermal insulation wall and an inner thermal insulation wall, and said outer thermal insulation wall having a thickness which decreases in an axial direction in which a thickness of the inner insulation wall increases.

12. A heater for generating high temperature heat, comprising:

an exhaust gas/air heat transfer device having a symmetrical configuration in an axial direction with a circular cross section, a combustion chamber disposed at least partially in an interior space enclosed by the exhaust gas/air heat transfer device, a high temperature heat transfer device connected to said combustion chamber, and said high temperature heat transfer device being transversed by fluid which passes through an endo-chemical transformation during operation of said heater.

* * * * *